(12) United States Patent
Iwano (10) Patent No.: US 10,000,243 B2
(45) Date of Patent: Jun. 19, 2018

(54) STRUCTURAL BODY OF DIFFERING THICKNESSES, AND METHOD OF MANUFACTURING THEREOF

(71) Applicant: TOYOTA JIDOSHA KABUSHIKI KAISHA, Toyota-shi, Aichi-ken (JP)

(72) Inventor: Yoshihiro Iwano, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 91 days.

(21) Appl. No.: 15/030,700

(22) PCT Filed: Sep. 26, 2014

(86) PCT No.: PCT/JP2014/075712
§ 371 (c)(1),
(2) Date: Apr. 20, 2016

(87) PCT Pub. No.: WO2015/064259
PCT Pub. Date: May 7, 2015

(65) Prior Publication Data
US 2016/0251039 A1  Sep. 1, 2016

(30) Foreign Application Priority Data
Oct. 30, 2013  (JP) .................................. 2013-225812

(51) Int. Cl.
*B62D 29/04* (2006.01)
*B29C 70/20* (2006.01)
(Continued)

(52) U.S. Cl.
CPC ............ *B62D 29/043* (2013.01); *B29C 43/16* (2013.01); *B29C 43/28* (2013.01);
(Continued)

(58) Field of Classification Search
None
See application file for complete search history.

(56) References Cited

U.S. PATENT DOCUMENTS 4,044,188 A * 8/1977 Segal .................... B29C 70/025
428/297.4
6,500,071 B1 * 12/2002 Pollard ...................... F16D 3/62
464/137

FOREIGN PATENT DOCUMENTS

DE         4140311 A1 *  6/1993  ............... F16D 3/78
JP     2004-262038 A     9/2004
(Continued)

OTHER PUBLICATIONS

Shimazaki (JP 2004-262038 A); Sep. 2004 (JPP Machine Translation to English).*

(Continued)

*Primary Examiner* — David Sample
*Assistant Examiner* — Donald M Flores, Jr.
(74) *Attorney, Agent, or Firm* — Oliff PLC (57) ABSTRACT

A structural body of differing thicknesses are provided that is made of resin, and a method of manufacturing thereof, that can improve quality in a case in which plate thickness changing portions extend in plural directions. A first panel portion and a second panel portion are connected by a first gradually changing portion. The first panel portion and a third panel portion are connected by a second gradually changing portion. The second panel portion and the third panel portion are connected by a third gradually changing portion. Further, an opening portion is formed to pass-through a door inner panel at a position where respective extensions of the first gradually changing portion, the second gradually changing portion and the third gradually changing portion intersect one another as seen in a plate thickness direction.

6 Claims, 7 Drawing Sheets

(51) Int. Cl.
    *B29C 69/00*     (2006.01)
    *B29C 43/16*     (2006.01)
    *B29C 70/54*     (2006.01)
    *B62D 25/10*     (2006.01)
    *B60J 5/04*     (2006.01)
    *B29C 45/16*     (2006.01)
    *B29C 43/28*     (2006.01)
    *B29C 45/00*     (2006.01)
    *B29C 70/14*     (2006.01)
    *B29K 105/08*     (2006.01)
    *B29L 31/30*     (2006.01)
    *B29K 105/14*     (2006.01)

(52) U.S. Cl.
    CPC .......... *B29C 45/0005* (2013.01); *B29C 45/16* (2013.01); *B29C 69/001* (2013.01); *B29C 70/14* (2013.01); *B29C 70/20* (2013.01); *B29C 70/545* (2013.01); *B60J 5/0413* (2013.01); *B60J 5/0481* (2013.01); *B62D 25/105* (2013.01); *B29C 2793/009* (2013.01); *B29C 2793/0018* (2013.01); *B29K 2105/08* (2013.01); *B29K 2105/14* (2013.01); *B29L 2031/30* (2013.01); *B29L 2031/3041* (2013.01)

(56) References Cited

FOREIGN PATENT DOCUMENTS

| | | | |
|---|---|---|---|
| JP | 2004262038 A | * 9/2004 | ............. B29C 45/14 |
| JP | 2011-143892 A | 7/2011 | |

OTHER PUBLICATIONS

Loebel et al. (DE4140311 A1); (Jun. 1993) (Google Patents—Machine Translation to English).*

* cited by examiner

STRUCTURAL BODY OF DIFFERING THICKNESSES, AND METHOD OF MANUFACTURING THEREOF

TECHNICAL FIELD

The present invention relates to a structural body of differing thicknesses and to a method of manufacturing thereof.

BACKGROUND ART

Methods of molding a base material of a thermoplastic resin are known (see, for example, Patent Document 1).

PRIOR ART DOCUMENTS

Patent Documents

[Patent Document 1] Japanese Patent Application Laid-Open (JP-A) No. 2004-262038

SUMMARY OF INVENTION

Technical Problem

However, there is room for improvement in quality m cases in which regions of differing plate thicknesses are set and the plate thickness changing portions extend in plural directions.

In view of the above-described circumstances, an object of the present invention is to provide a structural body of differing thicknesses and method of manufacturing thereof that can improve quality in a case in which plate thickness changing portions extend in plural directions.

Solution to Problem

A structural body of differing thicknesses relating to a first aspect of the present invention comprises: a plurality of panel portions that structure portions of a molded body of thermoplastic resin, and that are set to respectively different plate thicknesses; and as plurality of gradually changing portions that structure portions of the molded body, and that connect the panel portions, that are adjacent to one another, to one another, and whose plate thicknesses are gradually reduced from thick plate portion sides toward thin plate portion sides, and that extend rectilinearly as seen in a plate thickness direction, wherein an opening portion is formed in the molded body at a position when extensions of the gradually changing portions intersect one another as seen in the plate thickness direction.

In accordance with the above-described structure, the molded body of thermoplastic resin has the plural panel portions and the plural gradually changing portions. Respectively different plate thicknesses are set at the plural panel portions. The plural gradually changing portions connect together the panel portions that are adjacent to one another, and the plate thicknesses of the plural gradually changing portions are gradually reduced from the thick plate portion sides toward the thin plate portion sides, and the plural gradually changing portions extend rectilinearly as seen in the plate thickness direction. By providing such gradually changing portions, it is difficult for molding defects, that are due to differences in contractions at the time of solidifying, to arise. Further, the opening portion is formed in the molded body at a position where extensions of the gradually chang- ing portions intersect one another as seen in the plate thickness direction, and an intersection point portion where the gradually changing portions intersect one another does not exist. Accordingly, quality defects caused by the existence of such an intersection point portion do not arise.

In a second aspect of the present invention, in the structural body of differing thicknesses relating to the first aspect, the molded body is structured of a thermoplastic resin that contains reinforcing fibers, and, at the gradually changing portions, the reinforcing fibers are oriented along directions of connecting together the panel portions that are adjacent to one another.

In accordance with the above-described structure, the molded body is structured of a thermoplastic resin that contains reinforcing fibers. Due to the regions, that connect together panel portions that are adjacent to one another, being the gradually changing portions, the reinforcing fibers are oriented along directions of connecting the panel portions to one another, at the gradually changing portions. Therefore, the quality of the region that connects the panel portions to one another is good.

A method of manufacturing a structural body of differing thicknesses relating to a third aspect of the present invention comprises: a placement step of superposing, in at plate thickness direction, a second thermoplastic resin material that is plate-shaped on a portion of a first thermoplastic resin material that is plate-shaped, and placing the second thermoplastic resin material such that rectilinear step lines intersect as seen in a plate thickness direction; a molding step of, after the placement step, pressurizing and molding the first thermoplastic resin material and the second thermoplastic resin material by molding dies while, by heating, softening by melting and making the first thermoplastic resin material and the second thermoplastic resin material integral, and, by making step end surfaces that run along the step lines be inclined from thick plate portion sides toward thin plate portion sides, molding gradually changing portions at which plate thicknesses are gradually reduced from the thick plate portion sides toward the thin plate portion sides; and a cutting step of, after the molding step, cutting-out, from a molded body that has been molded by the molding step, a region that includes an intersection point where the plurality of gradually changing portions intersect as seen in a plate thickness direction of the molded body, and forming an opening portion.

In accordance with the above-described structure, in the placement step, the second thermoplastic resin material that is plate-shaped is superposed, in the plate thickness direction, on a portion of a first thermoplastic resin material that is plate-shaped, and the second thermoplastic resin material is placed such that such that the rectilinear step lines intersect as seen in the plate thickness direction. In the molding step that is after the placement step, the first thermoplastic resin material and the second thermoplastic resin material are pressurized and molded by molding dies, while, by heating, being softened by melting and made integral. Due thereto, in the stage before molding, there is no need to process thermoplastic resin materials into a plate material at which regions of differing plate thicknesses are set. Further, in the molding step, the gradually changing portions, at which the plate thicknesses are gradually reduced from the thick plate portion sides toward the thin plate portion sides, are molded by making the step end surfaces that run along the step lines be inclined from the thick plate portion sides toward the thin plate portion sides. By molding such gradually changing portions, it is difficult for molding defects, that are due to differences in contractions at the time of solidifying, to arise. Further, in the cutting step that is after the molding step, the region, that includes the intersection point where plural gradually changing portions intersect as seen in the plate thickness direction of the molded body that has been molded by the molding step, is cut-out from the molded body, and an opening portion is formed. Therefore, at the molded body that has been molded in the molding step, even if quality defects arise at the intersection point portion where the plural gradually changing portions intersect, the region that includes such an intersection point portion is cut-out in the cutting step, and therefore, the quality of the finished produced is not deteriorated.

In a fourth aspect of the present invention, in the method of manufacturing a structural body of differing thicknesses relating to the third aspect, the first thermoplastic resin material and the second thermoplastic resin material are structured of a thermoplastic resin that contains reinforcing fibers, and in the molding step, at the gradually changing portions, the reinforcing fibers are oriented along directions of connecting the thick plate portion sides and the thin plate portion sides.

In accordance with the above-described structure, the first thermoplastic resin material and the second thermoplastic resin material are structured of a thermoplastic resin that contains reinforcing fibers. Further, in the molding step, at the gradually changing portions, the reinforcing fibers are oriented along directions of connecting the thick plate portion sides and the thin plate portion sides. Therefore, the quality of the region that connects the thick plate portion sides and the thin plate portion sides is good.

In a fifth aspect of the present invention, in the method of manufacturing a structural body of differing thicknesses relating to the third aspect or the fourth aspect, in the placement step, two thermoplastic resin materials whose plate thicknesses differ from one another are used as the second thermoplastic resin material, and the two thermoplastic resin materials are superposed on the first thermoplastic resin material at respectively different regions, and the two thermoplastic resin materials are disposed adjacent to one another such that the step lines form a T-shape as seen in a plate thickness direction, and, in the cutting step, a region, that includes an intersection point where the plurality of gradually changing portions intersect in a T-shape as seen in a plate thickness direction of the molded body, is cut-out from the molded body.

In accordance the above-described structure, in the placement step, two thermoplastic resin materials whose plate thicknesses differ from one another are used as the second thermoplastic resin material. The two thermoplastic resin materials are superposed on the first thermoplastic resin material at respectively different regions, and the two thermoplastic resin materials are disposed adjacent to one another such that the step lines form a T-shape as seen in the plate thickness direction. Further, in the cutting step, a region, that includes the intersection point where the plural gradually changing portions intersect in a T-shape as seen in the plate thickness direction of the molded body, is cut-out from the molded body. Therefore, at the molded body that has been molded in the molding step, even if quality defects arise at the intersection point portion where the gradually changing portions intersect in a T-shape, the region that includes such an intersection point portion is cut-out in the cutting step, and therefore, the quality of the finished product is not deteriorated.

Advantageous Effects of Invention

As described above, the structural body of differing thicknesses relating to the first aspect of the present invention has the excellent effect that quality, in a case in which plate thickness changing portions extend in different directions, can be improved.

The structural body of differing thicknesses relating to the second aspect of the present invention has the excellent effect that the quality of a region that connects panel portions to one another can be made to be good.

The method of manufacturing a structural body of differing thicknesses relating to the third aspect of the present invention has the excellent effect that quality, in a case in which plate thickness changing portions extend in different directions, can be improved.

The method of manufacturing a structural body of differing thicknesses relating to the fourth aspect of the present invention has the excellent effect that the quality of a region, that connects the thick plate portion side and the thin plate portion side, can be made to be good.

The method of manufacturing a structural body of differing thicknesses relating to the fifth aspect of the present invention has the excellent effect that quality, in as case in which three regions of differing plate thicknesses are set adjacent to one another, can be improved.

DESCRIPTION OF EMBODIMENTS

First Embodiment

A structural body of differing thicknesses relating to a first embodiment of the present invention is described by using FIG. 1 through FIG. 5B. Note that arrow FR that is shown appropriately in these drawings indicates the door front side, arrow UP indicates the door upper side, and arrow IN indicates the vehicle cabin inner side in the closed state of the door.

Figure 1:
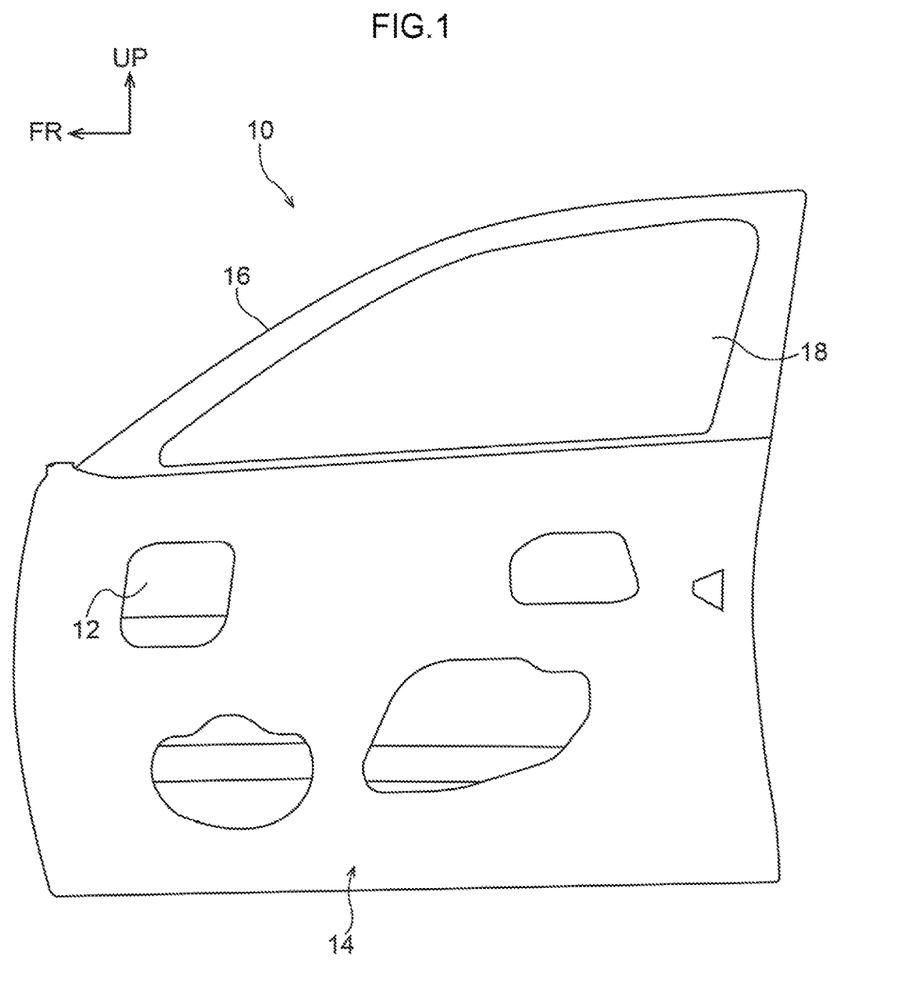
FIG. 1 is a drawing showing a door inner panel, that is a structural body of differing thicknesses relating to a first embodiment of the present invention, together with other structural portions of a vehicle side door in a state of being viewed from a door inner surface side.

A door inner panel 14, that serves as a structural body of differing thicknesses relating to the present embodiment, is shown, together with other structural portions of a vehicle side door 10, in FIG. 1 in a state of being viewed from the door inner surface side. The vehicle side door 10 shown in FIG. 1 is disposed at a vehicle side portion. A door outer panel 12 that structures a door outer plate is disposed at the door outer surface side of the vehicle side door 10 (the vehicle transverse direction outer side in the closed state of the door). The door inner panel 14 that structures a door inner plate is disposed at the door inner surface side of the vehicle side door 10 (the vehicle transverse direction inner side in the closed state of the door). Note that a door window frame 16 that is a frame-shaped body is provided at the door upper side of the door outer panel 12, and a window glass 18 can be disposed within the door window frame 16.

Figure 2:
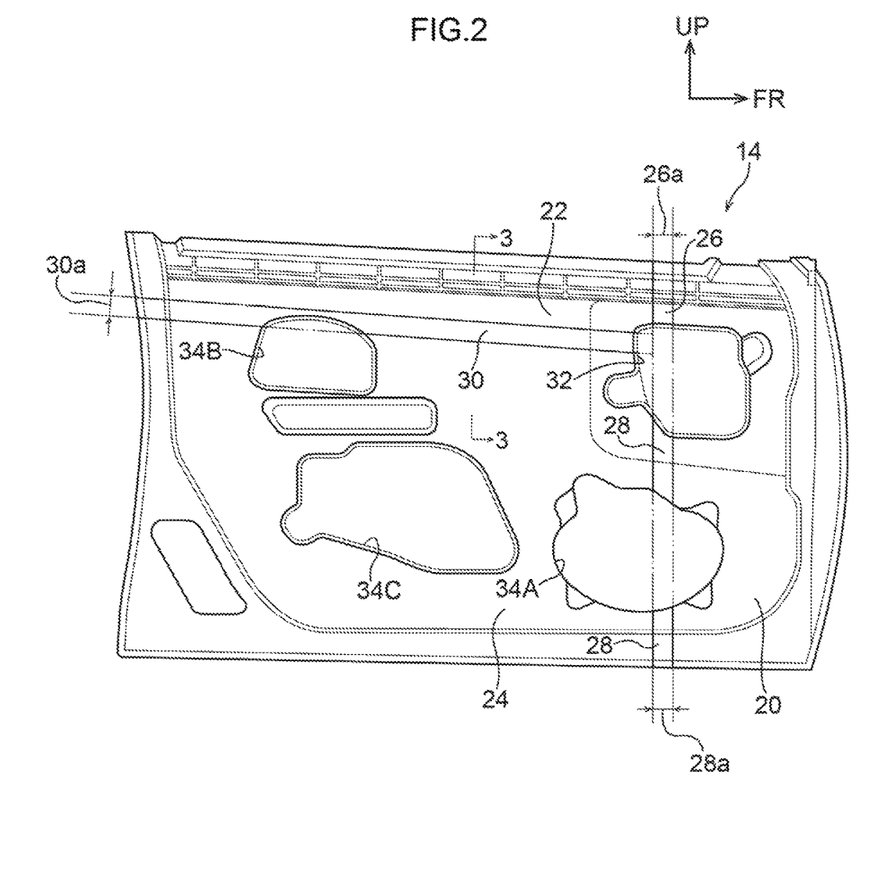
FIG. 2 is a drawing showing the door inner panel of FIG. 1 in a state of being viewed from a door outer surface side.

The door inner panel 14 is shown in FIG. 2 in a state of being viewed from the door outer surface side. The door inner panel 14 is made to be a molded body of a thermoplastic resin. For example, polyamide or polyolefin (e.g., polypropylene) or the like can be used as the thermoplastic resin. Further, in the present embodiment, the door inner panel 14 is structured from a thermoplastic resin that contains reinforcing fibers (as an example, glass fibers or carbon fibers), i.e., a composite material (a fiber reinforced resin (FRP)), that is formed by reinforcing fibers being solidified in a thermoplastic resin. Note that fiber reinforced resins have the feature that the strength thereof is high but the fluidity at the time of molding is poor, as compared with resins in which reinforcing fibers are not contained.

The door inner panel 14 is provided with a first panel portion 20, a second panel portion 22 and a third panel portion 24 that serve as plural panel portions and that are set to respectively different plate thicknesses. The first panel portion 20 structures the front portion in the door longitudinal direction at the door inner panel 14. The second panel portion 22 structures the rear side in the door longitudinal direction and the upper portion in the door vertical direction with respect to the first panel portion 20 at the door inner panel 14. The third panel portion 24 structures the region that is at the rear side in the door longitudinal direction with respect to the first panel portion 20 and at the lower side in the door vertical direction with respect to the second panel portion 22, at the door inner panel 14.

A plate thickness T1 of the first panel portion 20, a plate thickness T2 of the second panel portion 22, and a plate thickness T3 of the third panel portion 24 are set so as to be in the relationship T2>T1>T3. The plate thickness T2 of the second panel portion 22 is set to be thick because a predetermined strength is required at this region at the time of a collision or the like. Further, the plate thickness T1 of the first panel portion 20 is set to be thick because strength is required at the first panel portion 20 due to unillustrated door hinges being provided at the first panel portion 20.

The first panel portion 20 and the second panel portion 22 are adjacent to one another in the door longitudinal direction, and are connected by a first gradually changing portion 26. The plate thickness of the first gradually changing portion 26 is gradually reduced from the second panel portion 22 side (the thick plate portion side) toward the first panel portion 20 side (the thin plate portion side). At the first gradually changing portion 26, the reinforcing fibers are oriented along the direction of connecting the first panel portion 20 and the second panel portion 22. The first gradually changing portion 26 extends rectilinearly in the door vertical direction as seen in the plate thickness direction. Reference numeral 26a in the drawings indicates the width of the range of gradual change (the section of gradual change) at the first gradually changing portion 26.

Further, the first panel portion 20 and the third panel portion 24 are adjacent to one another in the door longitudinal direction, and are connected by a second gradually changing portion 28. The plate thickness of the second gradually changing portion 28 is gradually reduced from the first panel portion 20 side (the thick plate portion side) toward the third panel portion 24 side (the thin plate portion side). At the second gradually changing portion 28, the reinforcing fibers are oriented along the direction of connecting the first panel portion 20 and the third panel portion 24. The second gradually changing portion 28 extends rectilinearly in the door vertical direction as seen in the plate thickness direction. Reference numeral 28a in the drawings indicates the width of the range of gradual change (the section of gradual change) at the second gradually changing portion 28.

Moreover, the second panel portion 22 and the third panel portion 24 are adjacent to one another in the door vertical direction, and are connected by as third gradually changing portion 30. The plate thickness of the third gradually changing portion 30 is gradually reduced from the second panel portion 22 side (the thick plate portion side) toward the third panel portion 24 side (the thin plate portion side). At the third gradually changing portion 30, the reinforcing fibers are oriented along the direction of connecting the second panel portion 22 and the third panel portion 24. The third gradually changing portion 30 extends rectilinearly in the door longitudinal direction as seen in the plate thickness direction. Reference numeral 30a in the drawings indicates the width of the range of gradual change (the section of gradual change) at the third gradually changing portion 30.

Figure 3:
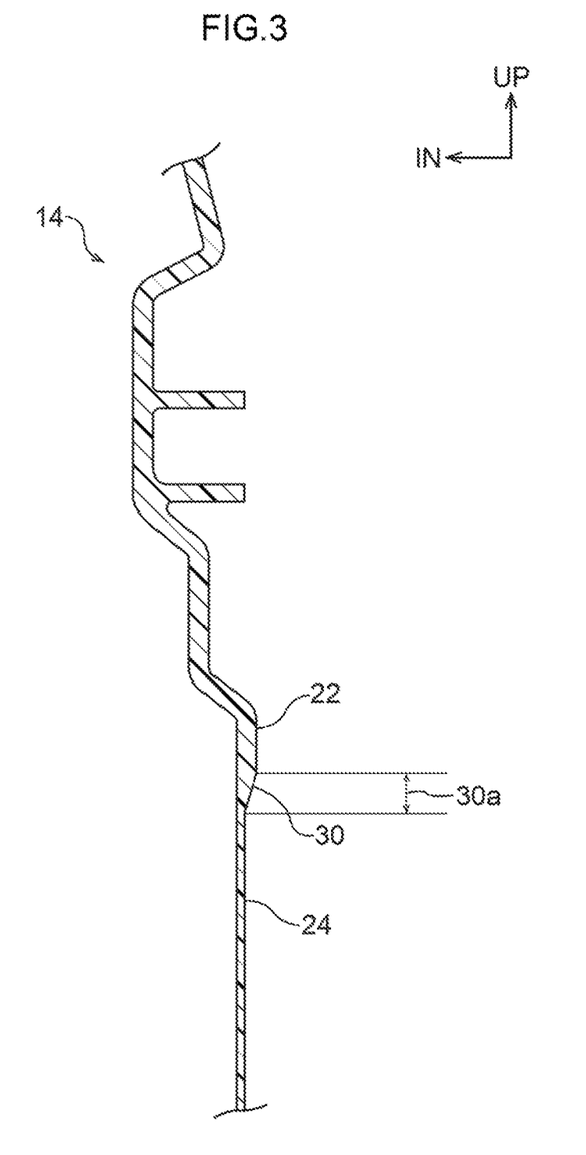
FIG. 3 is an enlarged sectional view along line 3-3 of FIG. 2.

An enlarged sectional view along line 3-3 of FIG. 2 is shown in FIG. 3. In the present embodiment, as an example, the third gradually changing portion 30 gradually changes such that the door outer surface side thereof approaches the door inner surface side toward the door lower side. Further, although not illustrated, as an example, the first gradually changing portion 26 gradually changes such that the door outer surface side thereof approaches the door inner surface side toward the door front side. Further, as an example, the second gradually changing portion 28 gradually changes such that the door outer surface side thereof approaches the door inner surface side toward the door rear side.

An opening portion 32 is formed so as to pass-through the door inner panel 14 at a position where respective extensions of the first gradually changing portion 26, the second gradually changing portion 28 and the third gradually changing portion 30 intersect one another as seen in the plate thickness direction. This opening portion 32 is used as a work hole (a service hole) for mounting structural parts of the vehicle side door 10 (see FIG. 1).

An opening 34A is formed so as to pass-through the door inner panel 14 at the door lower side of the opening portion 32. The opening 34A is formed so as to span over the first panel portion 20 and the third panel portion 24, and divides the second gradually changing portion 2$ up and down. An opening 34B is formed so as to pass-through the door inner panel 14 at the door rear side of the opening portion 32. The opening 34B formed so as to span over the third panel portion 24 and the third gradually changing portion 30. Further, an opening 34C is also formed so as to pass-through the central portion of the third panel portion 24 of the door inner panel 14. These openings 34A, 34B, 34C also are used as work holes.

(Method of Manufacturing Structural Body of Differing Thicknesses and Operation/Effects)

The operation and effects of the present embodiment are described next while describing the method of manufacturing the structural body of differing thicknesses (the door inner panel 14) with reference to FIG. 4A through FIG. 4C and FIG. 5A and FIG. 5B.

Figure 4A:
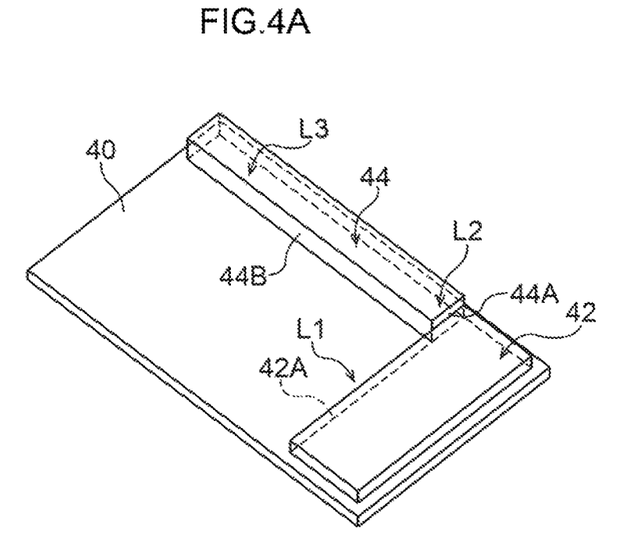
FIG. 4A is a schematic perspective view for explaining as method of manufacturing the structural body of differing thicknesses relating to the first embodiment of the present invention, and shows thermoplastic resin materials after a placement step.
Figure 4B:
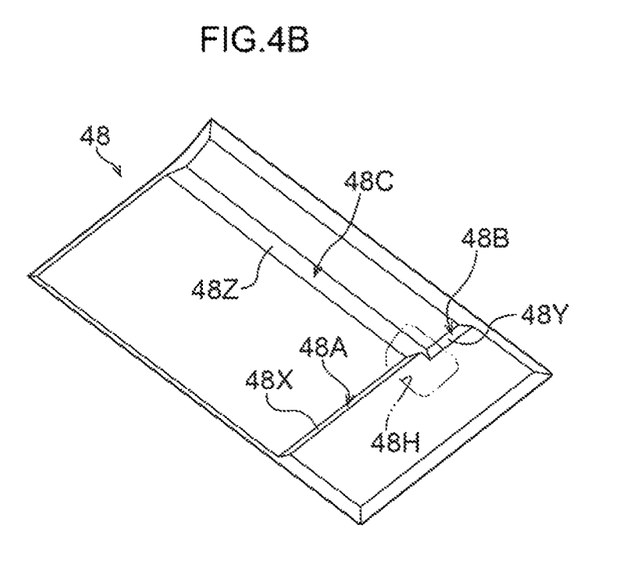
FIG. 4B is a schematic perspective view for explaining the method of manufacturing the structural body of differing thicknesses relating to the first embodiment of the present invention, and shows the thermoplastic resin materials alter a molding step.
Figure 4C:
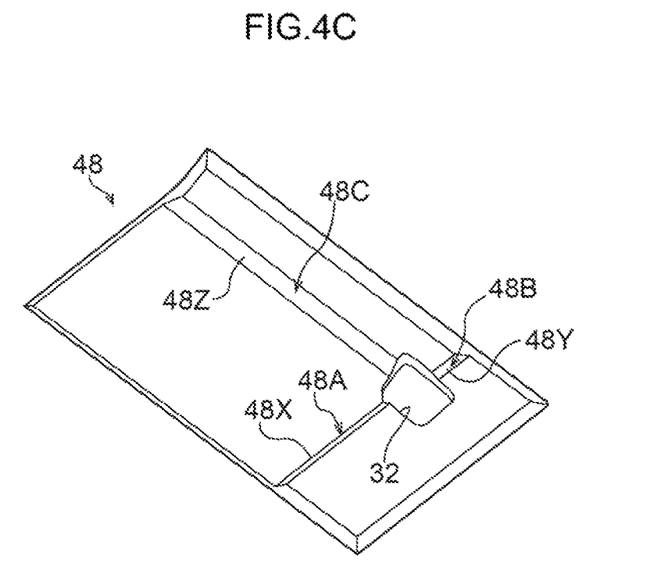
FIG. 4C is a schematic perspective view for explaining the method of manufacturing the structural body of differing thicknesses relating to the first embodiment of the present invention, and shows the thermoplastic resin materials after a cutting step.
Figure 5A:
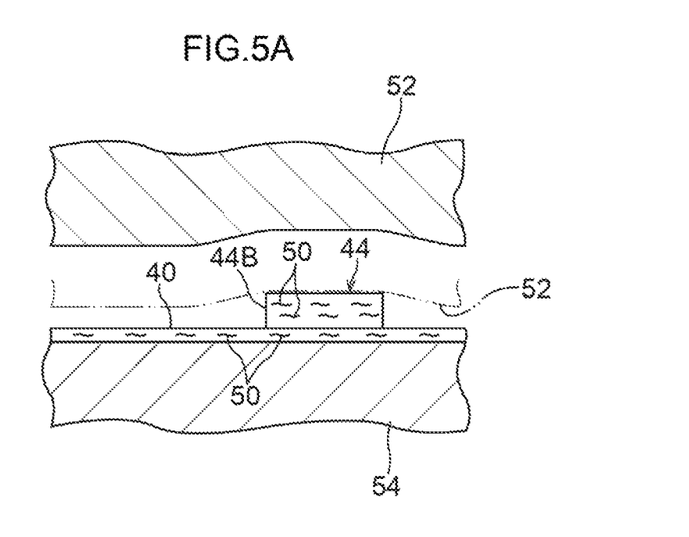
FIG. 5A is a schematic vertical sectional view for explaining the molding step, and shows a state before molding.
Figure 5B:
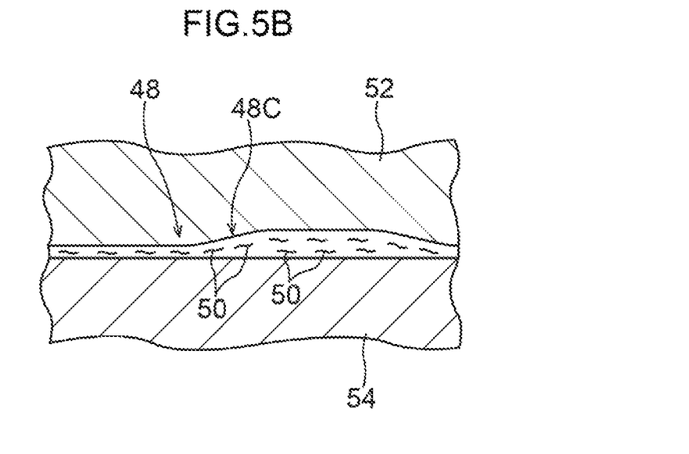
FIG. 5B is a schematic vertical sectional view for explaining the molding step, and shows a state at a time of molding.

Schematic perspective views for explaining the method of manufacturing the structural body of differing thicknesses relating to the present embodiment are shown in FIGS. 4A through 4C. FIG. 4A illustrates thermoplastic resin materials after a placement step, FIG. 4B illustrates the thermoplastic resin materials after a molding step, and FIG. 4C illustrates the thermoplastic resin materials after a cutting step. Further, schematic vertical sectional views for explaining the molding step are shown in FIG. 5A and FIG. 5B. FIG. 5A illustrates a state before molding, and FIG. 5B illustrates a state at the time of molding. Note that, in FIG. 5A and FIG. 5B, reinforcing fibers are illustrated schematically and are denoted by reference numeral 50.

First, as shown in FIG. 4A, in the placement step, second thermoplastic resin materials 42, 44 that are plate-shaped are superposed in the plate thickness direction on portions of a first thermoplastic resin material 40 that is plate-shaped, and the second thermoplastic resin materials 42, 44 are disposed such that step lines L1, L2, L3 that are rectilinear intersect one another as seen in the plate thickness direction. The first thermoplastic resin material 40 and the second thermoplastic resin materials 42, 44 are structured by a thermoplastic resin that contains reinforcing fibers as described above. In the present embodiment, two thermoplastic resin materials whose plate thicknesses differ from one another are used as the second thermoplastic resin materials 42, 44. Namely, the plate thickness of the one second thermoplastic resin material 44 is set to be thicker than the plate thickness of the other second thermoplastic resin material 42. Further, in the placement step, the two second thermoplastic resin materials 42, 44 are superposed on the first thermoplastic resin material 40 at respectively different regions, and the two second thermoplastic resin materials 42, 44 are disposed adjacent to one another such that the step lines L1, L2, L3 form a T-shape as seen in the plate thickness direction. In this state, the first thermoplastic resin material 40 and the second thermoplastic resin materials 42, 44 are held between a first molding die 52 and a second molding die 54 that are shown in FIG. 5A.

After the placement step, the molding step is carried out. In the molding step, the first molding die 52 and the second molding die 54, that are being heated or have been preheated by unillustrated heaters, are made to approach one another relatively (refer to the two-dot chain line in FIG. 5A), and, as shown in FIG. 5B, the first thermoplastic resin material 40 and the second thermoplastic resin materials 42, 44 (see FIG. 4A) are pressurized and molded (press molded) by the first molding die 52 and the second molding die 54 while, by the heating, being softened by melting and made integral. Due thereto, there is no need to, in the stage before molding, process the thermoplastic resin materials into a plate material at which regions of differing plate thicknesses are set. Note that, at the time of pressurizing and molding, the first thermoplastic resin material 40 and the second thermoplastic resin materials 42, 44 (see FIG. 4A) are heated to the melting point of these resin materials.

Further, in this molding step, gradually changing portions 48A, 48B, 48C, whose plate thicknesses are gradually reduced from the thick plate portion sides toward the thin plate portion sides, are molded due to step end surfaces 42A, 44A, 44B, that run along the step lines L1, L2, L3 shown in FIG. 4A, being made to be inclined from the thick plate portion sides toward the thin plate portion sides (front the sides that are superposed on the thermoplastic resin material toward the sides that are not superposed) as shown in FIG. 4B. A portion of the gradually changing portion 48A eventually becomes the second gradually changing portion 28 (see FIG. 2), and a portion of the gradually changing portion 48B eventually becomes the first gradually changing portion 26 (see FIG. 2), and a portion of the gradually changing portion 48C eventually becomes the third gradually changing portion 30 (see FIG. 2). Due to these gradually changing portions 48A, 48B, 48C being molded, it is difficult for molding defects, that are due to the difference in contractions at the time of solidifying, to arise. Further, in the molding step, the reinforcing fibers 50 (see FIG. 5B) are oriented along the directions of connecting the thick plate portion sides and the thin plate portion sides at the gradually changing portions 48A, 48B, 48C.

To supplement description thereof, as shown by the two-dot chain line in FIG. 5A, at the first thermoplastic resin material 40 and the second thermoplastic resin materials 42, 44, in the molding step, first, the thick plate portions are pressed, and due thereto, force that causes the resin materials to start to spread in the lateral direction is applied toward the lower portion side to the thick plate portions. Due thereto, the step portion end surfaces 42A, 44A, 44B shown in FIG. 4A become inclined, and inclined portions 48X, 48Y, 48Z shown in FIG. 4B are formed. Further, the inclined portion 48X structures the obverse of the gradually changing portion 48A, and the inclined portion 48Y structures the obverse of the gradually changing portion 48B, and the inclined portion 48Z structures the obverse of the gradually changing portion 48C. Note that the rising inclination angles of the inclined portions 48X, 48Y, 48Z at the gradually changing portions 48A, 48B, 48C are set to less than 45° in the present embodiment. Further, as shown in FIG. 5B, in the process in which the regions between the thick plate portions and the thin plate portions are made into the gradually inclined portions 48A, 48B, 48C (refer to FIG. 4B for 48A, 48B), the reinforcing fibers 50 are oriented at (enter into) the gradually changing portions 48A, 48B, 48C along the directions of flow of the resin materials. Therefore, the quality of the regions that connect the thick plate portion sides and the thin plate portion sides is good.

By the way, of the first thermoplastic resin material 40 and the second thermoplastic resin materials 42, 44 that are illustrated in FIG. 4A, the surface layer portion (the layer that includes the reinforcing fibers of the uppermost portion) of the region that the first molding die 52 shown in FIG. 5A initially hits (the thick plate portion) stays at the initial position without flowing even if pressurized. Then, the thermoplastic resin material, at which the first thermoplastic resin material 40 and the second thermoplastic resin materials 42, 44 (see FIG. 4A) have become integral, is molded in a state in which, among the regions that face the first molding die 52 side, the aforementioned surface layer portion is the highest temperature. For these reasons, traces (mold marks) where the first molding die 52 initially hits remain at the aforementioned surface layer portion.

After the molding step, the cutting step is carried out. In the cutting step, a region 48H, that includes the intersection point where the plural gradually changing portions 48A, 48B, 48C intersect in a T-shape as seen in the plate thickness direction of a molded body 48 that is shown in FIG. 4B and that has been molded in the molding step, is cut-out (trimmed) by an unillustrated shearing machine from the molded body 48, and the opening portion 32 that is shown in FIG. 4C is formed. Therefore, at the molded body 48 that has been molded in the molding step, even if quality defects arise at the intersection point portion where the gradually changing portions 48A, 48B, 48C intersect in a T-shape, the region that includes such an intersection point portion is cut-out in the cutting step, and therefore, quality defects caused by the existence of the aforementioned intersection point portion do not arise (namely, the quality of the finished produced is not deteriorated). Further, by forming the opening portion 32 after the molding step and not forming the opening portion 32 in the molding step, the quality of the end portions, at the opening portion 32 side, of the gradually changing portions 48A, 48B, 48C can be made to be good.

As described above, in accordance with the present embodiment, the quality in a case in which plate thickness changing portions extend in plural directions can be improved. Further, in accordance with the present embodiment, even though regions, at which the plate thicknesses differ, exist at three places and these regions are adjacent to one another, quality can be ensured.

Further, in the present embodiment, by setting the regions of differing plate thicknesses, the arranging of members for reinforcing the door rattier panel 14 becomes unnecessary. Therefore, the number of parts, cost, mass, and processes are reduced, and further, the workability at the time of manufacturing can be improved.

Second Embodiment

A structural body of differing thicknesses relating to a second embodiment of the present invention is described next by using FIG. 6. A hood inner panel 60 that serves s a structural body of differing thicknesses relating to the present embodiment is shown in a plan view in FIG. 6. Note that, in FIG. 6, the lower side in the drawing is shown as the hood front side of the hood inner panel 60.

The hood inner panel 60 is a molded body of a thermoplastic resin that is similar to the first embodiment, and is structured by a thermoplastic resin that contains reinforcing fibers. The hood inner panel 60 has a first panel portion 62, a pair of left and right second panel portions 64, and a third panel portion 66, that serve as plural panel portions and that are set to respectively different plate thicknesses. The second panel portions 64 structure the rear portion in the hood longitudinal direction and the both side portions in the hood transverse direction at the hood inner panel 60. The third panel 66 structures the front portion in the hood longitudinal direction and the central portion the hood transverse direction at the hood inner panel 60. The first panel portion 62 structures the majority of the region, other than the second panel portions 64 and the third panel portion 66, of the hood inner panel 60.

Plate thickness t1 of the first panel portion 62, plate thickness t2 of the second panel portions 64, and plate thickness t3 of the third panel portion 66 are set so as to be in the relationship t3>t2>t1. The plate thickness t3 of the third panel portion 66 is set to be thick because strength is required at the third panel portion 66 due to the provision of an unillustrated hood locking mechanism in correspondence with the third panel portion 66. Further, the plate thickness t2 of the second panel portions 64 is set to be thick because strength is required at the second panel portions 64 due to the provision of unillustrated hood hinges at the second panel portions 64.

The first panel portion 62 and the second panel portions 64 that are adjacent to one another are connected by first gradually changing portions 70A and second gradually changing portions 70B. The plate thicknesses of the first gradually changing portions 70A and the second gradually changing portions 70B are gradually reduced from the second panel portion 64 sides (the thick plate portion sides) toward the first panel portion 62 sides (the thin plate portion sides). At the first gradually changing portions 70A and the second gradually changing portions 70B, reinforcing fibers are oriented along the directions of connecting the first panel portion 62 and the second panel portion 64 at the respective regions. The first gradually changing portions 70A extend rectilinearly in the hood longitudinal direction as seen in the plate thickness direction. The second gradually changing portions 70B extend rectilinearly in the hood transverse direction as seen in the plate thickness direction.

Further, the first panel portion 62 and the third panel portion 66 that are adjacent to one another are connected by third gradually changing portions 72A and a fourth gradually changing portion 72B. The plate thicknesses of the third gradually changing portions 72A and the fourth gradually changing portion 72B are gradually reduced from the third panel portion 66 side (the thick plate portion side) toward the first panel portion 62 side (the thin plate portion side). At the third gradually changing portions 72A and the fourth gradually changing portion 72B, reinforcing fibers are oriented along the directions of connecting the first panel portion 62 and the third panel portion 66 at the respective regions. The third gradually changing portions 72A extend rectilinearly in the hood longitudinal direction as seen in the plate thickness direction. The fourth gradually changing portion 72B extends rectilinearly in the hood transverse direction as seen in the plate thickness direction.

Opening portions 74A are formed so as to pass-through the hood inner panel 60 at positions where respective extensions of the first gradually changing portions 70A and the second gradually changing portions 70B intersect one another as seen in the plate thickness direction. Further, opening portions 74B are formed so as to pass-through the hood inner panel 60 at positions where respective extensions of the third gradually changing portions 72A and the fourth gradually changing portion 72B intersect one another as seen in the plate thickness direction.

(Method of Manufacturing Structural Body of Differing Thicknesses)

The operation and effects of the present embodiment are described next while summarizing the method of manufacturing the structural body of differing thicknesses (the hood inner panel 60) although detailed illustration thereof is omitted.

First, in the placement step, second thermoplastic resin materials that are plate-shaped are superposed in the plate thickness direction on portions of a first thermoplastic resin material that is plate-shaped, at positions where the second panel portions 64 and the third panel portion 66 are to be set, and the second thermoplastic resin materials are disposed such that step lines that are rectilinear intersect one another as seen in the plate thickness direction. The first thermoplastic resin material and the second thermoplastic resin materials are structured by a thermoplastic resin that contains reinforcing fibers.

After the placement step, the molding step is carried out. In the molding step, the first thermoplastic resin material and the second thermoplastic resin materials are pressurized and molded by molding dies while, by heating, being softened by melting and made integral. Further, in the molding step, gradually changing portions, whose plate thicknesses are gradually reduced from the thick plate portion sides toward the thin plate portion sides, are molded due to step end surfaces that run along the step lines being made to be inclined from the thick plate portion sides toward the thin plate portion sides (from the sides that are superposed on the thermoplastic resin material toward the sides that are not superposed). Portions of the gradually changing portions eventually become the first gradually changing portions 70A, the second gradually changing portions 70B, the third gradually changing portions 72A and the fourth gradually changing portion 72B. Due to these gradually changing portions being molded, it is difficult for molding defects, that are due to the difference in contractions at the time of solidifying, to arise. Further, in the molding step, the reinforcing fibers are oriented along the directions of connecting the thick plate portion sides and the thin plate portion sides at the gradually changing portions. Therefore, the quality of the regions that connect the thick plate portion sides and the thin plate portion sides is good.

After the molding step, the cutting step is carried out. In the cutting step, regions, that include the intersection points where the plural gradually changing portions intersect as seen in the plate thickness direction of the molded body that has been molded in the molding step, are cut-out from the molded body, and the opening portions 74A, 74B are formed. Therefore, at the molded body that has been molded in the molding step, even if quality defects arise at the intersection point portions where the gradually changing portions intersect, the regions that include such intersection point portions are cut-out in the cutting step.

As described above, in accordance with the present embodiment as well, the quality in a case in which plate thickness changing portions extend in plural directions can be improved.

Supplementary Description of Embodiments

Figure 6:
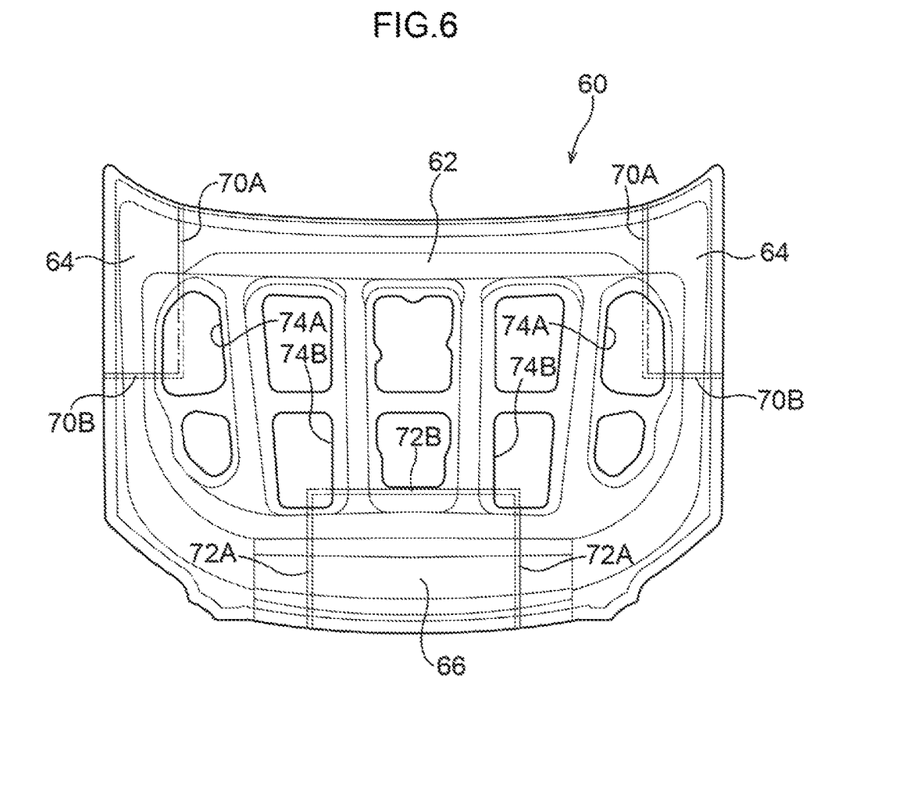
FIG. 6 is a plan view showing a hood inner panel that is a structural body of differing thicknesses relating to a second embodiment of the present invention.

Note that, in the above-described embodiments, the present invention is applied to the door inner panel 14 (see FIG. 2) and the hood inner panel 60 (see FIG. 6). However, for example, the present invention may be applied to an opening/closing cover for a vehicle such as the inner panel of a vehicle trunk door and the inner panel of as vehicle back door and the like, or to a pillar portion such as a center pillar (B pillar) and a front pillar (A pillar) and the like. Further, in the present invention, quality can be ensured even if regions of different plate thicknesses exist at three places or more, and in addition, there is a large number of degrees of freedom in setting the gradually changing portions (the gradually changing lines).

Further, in the above-described embodiments, the door inner panel 14 (see FIG. 2) and the hood inner panel 60 (see FIG. 6) are structured by a thermoplastic resin that contains reinforcing fibers, but the molded body may be a molded body that is structured by a thermoplastic resin that does not contain reinforcing fibers.

Further, in the manufacturing methods of the above-described embodiments, the first thermoplastic resin material 40 and the second thermoplastic resin material 42 that are shown in FIG. 4A and the like are structured by a thermoplastic resin that contains the reinforcing fibers 50 (see FIG. 5A). However, the first thermoplastic resin material and the second thermoplastic resin material may be structured by a thermoplastic resin that does not contain reinforcing fibers.

Further, in the above-described embodiments, the opening portion 32 (see FIG. 2) and the opening portions 74A, 74B (see FIG. 6) are made to be through-holes. However, the opening portions, that are formed at positions where extensions of the gradually changing portions intersect one another, may be other opening portions such as, for example, C-shaped cut-out portions or the like.

The above-described embodiments and the above-described plural modified examples can be implemented by being combined together appropriately.

Although examples of the present invention have been described above, the present invention is not limited to the above, and, in addition to the above, can of course be implemented by being modified in various ways within a scope that does not depart from the gist thereof.

Note that the disclosure of Japanese Patent No. 2013-225812 is in its entirety, incorporated by reference into the present specification.

The invention claimed is:

1. A structural body of differing thicknesses comprising:
a plurality of panel portions, the panel portions structuring portions of a molded body of thermoplastic resin and being set to respectively different plate thicknesses; and
a plurality of gradually changing portions, the gradually changing portions structuring portions of the molded body, the gradually changing portions connecting together panel portions adjacent to one another, plate thicknesses of the gradually changing portions being gradually reduced from thicker plate portion sides toward thinner plate portion sides, and the gradually changing portions extending rectilinearly as seen in a plate thickness direction, respective reduced thicknesses of the gradually changing portions being different from each other,
wherein an opening portion is formed in the molded body at a position where extensions of the gradually changing portions intersect one another as seen in the plate thickness direction.

2. The structural body of differing thicknesses of claim 1, wherein:
the molded body is structured of a thermoplastic resin containing reinforcing fibers, and
the reinforcing fibers are oriented along directions connecting together the panel portions adjacent to one another at the gradually changing portions.

3. A method of manufacturing a structural body of differing thicknesses, the method comprising:
superposing, in a plate thickness direction, a second thermoplastic resin material having a plate shape on a portion of a first thermoplastic resin material having a plate shape, and placing the second thermoplastic resin material such that rectilinear step lines intersect as seen in a plate thickness direction;
after the placing, pressurizing and molding the first thermoplastic resin material and the second thermoplastic resin material by molding dies, while melt softening by heating the first thermoplastic resin material and the second thermoplastic resin material and making the first thermoplastic resin material and the second thermoplastic resin material integral, and, molding gradually changing portions, plate thicknesses of the gradually changing portions being gradually reduced from thicker plate portion sides toward thinner plate portion sides, by making step end surfaces running along the step lines inclined from the thicker plate portion sides toward the thinner plate portion sides, such that respective reduced thicknesses of the gradually changing portions are different from each other; and after the molding, cutting out, from a molded body molded in the molding, a region including an intersection point where the plurality of gradually changing portions intersect as seen in a plate thickness direction of the molded body, and forming an opening portion.

4. The method of manufacturing a structural body of differing thicknesses of claim 3, wherein:

the first thermoplastic resin material and the second thermoplastic resin material are structured of a thermoplastic resin containing reinforcing fibers, and in the molding, at the gradually changing portions, the reinforcing fibers are oriented along directions connecting the thicker plate portion sides and the thinner plate portion sides.

5. The method of manufacturing a structural body of differing thicknesses of claim 4, wherein:

in the placing, two thermoplastic resin materials having different plate thicknesses from one another are used as the second thermoplastic resin material, the two thermoplastic resin materials are superposed on the first thermoplastic resin material at respectively different regions, and the two thermoplastic resin materials are disposed adjacent to one another such that the step lines form a T-shape as seen in the plate thickness direction, and in the cutting, a region including an intersection point where the plurality of gradually changing portions intersect in a T-shape as seen in the plate thickness direction of the molded body is cut-out from the molded body.

6. The method of manufacturing a structural body of differing thicknesses of claim 3, wherein:

in the placing, two thermoplastic resin materials having different plate thicknesses from one another are used as the second thermoplastic resin material, the two thermoplastic resin materials are superposed on the first thermoplastic resin material at respectively different regions, and the two thermoplastic resin materials are disposed adjacent to one another such that the step lines form a T-shape as seen in the plate thickness direction, and in the cutting, a region including an intersection point where the plurality of gradually changing portions intersect in a T-shape as seen in the plate thickness direction of the molded body is cut-out from the molded body.

* * * * *